United States Patent [19]

Hartley

[11] Patent Number: 4,637,879

[45] Date of Patent: Jan. 20, 1987

[54] APPARATUS FOR USE IN FILTERING A LIQUID

[76] Inventor: Philip J. Hartley, 24 Ardoyne House, Pembroke Park, Ballsbridge, Dublin 4, Ireland

[21] Appl. No.: 755,664

[22] Filed: Jul. 16, 1985

[30] Foreign Application Priority Data

Nov. 15, 1984 [IE] Ireland ............................. 2940/84

[51] Int. Cl.$^4$ ............................................. B01D 27/00
[52] U.S. Cl. ....................................... 210/448; 210/450; 210/452
[58] Field of Search ............... 210/420, 435, 437, 445, 210/448, 450, 452, 453, 457, 489

[56] References Cited

U.S. PATENT DOCUMENTS

| | | | |
|---|---|---|---|
| 934,076 | 9/1909 | Kneuper | 210/457 |
| 1,585,246 | 5/1926 | Hoy | 210/437 |
| 1,917,203 | 7/1933 | Heinz | 210/232 |
| 2,440,487 | 4/1948 | Rayburn | 210/232 |
| 2,584,387 | 2/1952 | Hervuot | 210/437 |
| 2,768,751 | 10/1956 | Booth | 210/453 |
| 2,994,435 | 8/1961 | Moore | 210/457 |
| 3,016,984 | 1/1962 | Getzin | 210/232 |
| 3,358,839 | 12/1967 | Simons | 210/232 |
| 3,394,815 | 7/1968 | Harms | 210/323 |
| 3,633,752 | 1/1972 | Kurpgeweit | 210/232 |

FOREIGN PATENT DOCUMENTS

| | | |
|---|---|---|
| 1116635 | 11/1961 | Fed. Rep. of Germany . |
| 1959867 | 6/1970 | Fed. Rep. of Germany ...... 210/483 |
| 2512781 | 9/1976 | Fed. Rep. of Germany . |
| 864539 | 4/1961 | United Kingdom . |
| 1096907 | 12/1967 | United Kingdom . |

Primary Examiner—John Adee
Attorney, Agent, or Firm—Curtis, Morris & Safford

[57] ABSTRACT

The invention relates to an apparatus for filtering a liquid—in particular milk. There is provided a tubular stainless steel casing (2) which has an inlet (3) and an outlet (4) for the milk. The casing (2) houses a filtering device (5) comprising a cage of metal rods (305) welded to a coiled spring (405) and which has fitted thereon a disposable filter sock (6). The filter sock (6) is held in operative position on the filtering device (5) by a collar (205) and a plug (7) adjacent the outlet (4) while at the opposite end of the casing (2) there is provided a removable lid (9) held in use in a locked position by a lock nut (10).

7 Claims, 14 Drawing Figures

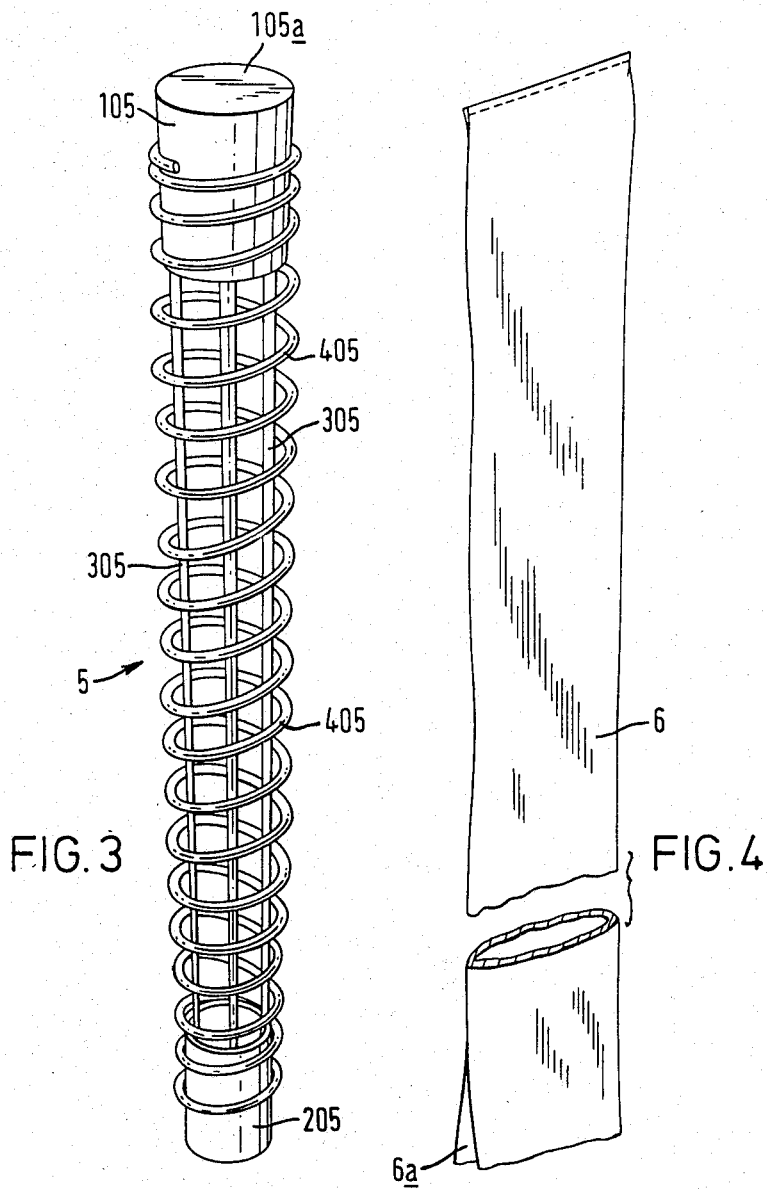

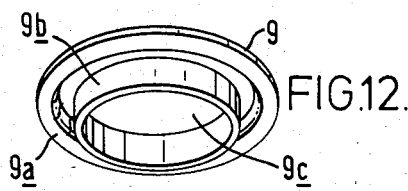
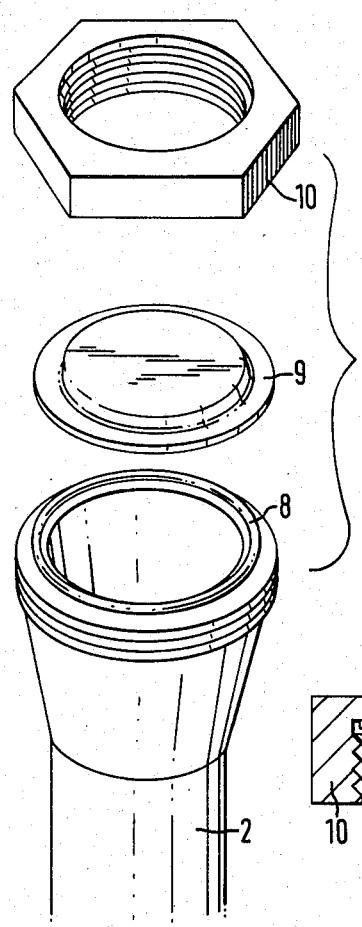
FIG.11.
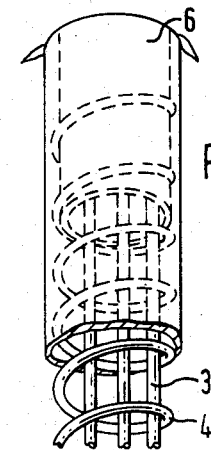
FIG.13.
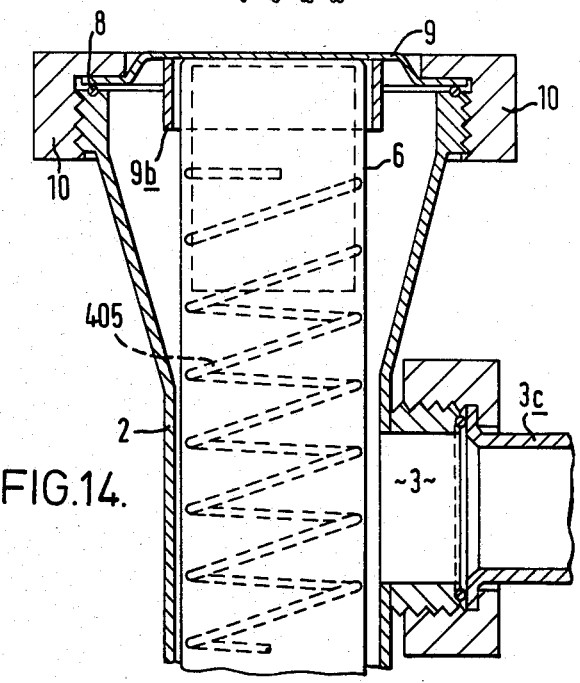
FIG.14.

APPARATUS FOR USE IN FILTERING A LIQUID

This invention relates to an apparatus for use in filtering a liquid. In particular, it relates to an apparatus for use in filtering milk being transferred from a milk storage tank to a mobile tanker or vice versa.

Apparatus for filtering milk being transferred via a milk pump outlet to a milk storage unit such as a tank, mobile tank or churn are known. Essentially, the known apparatus comprises two basic types.

In the first known type, the apparatus comprises a tubular shaped casing having an inlet port and an outlet port for a liquid. Into the casing is inserted a support frame for a filter element in the form of a sock. The support frame essentially comprises a pair of tubular members linked by a wire frame in the form of a coil spring or spiral. The mouth of the sock is first threaded over one of the tubular members and then pulled over the support frame. The sock is slightly longer than the support frame and thus the open end of the sock may be tucked up inside the other tubular member. The support frame is insertable through an opening in the casing, and rests on a liquid tight seal locatable at the outlet port. A cover is provided for the casing also having a liquid tight seal. Thus a liquid which is pumped through the inlet port of the casing must pass through the filter sock before exiting at the outlet port.

A significant disadvantage of the first type is that under relatively high or low pressure discharge conditions, vibration of the support frame occurs. Furthermore, by virtue of the vibration, the liquid tight seal at the outlet port is frequently ineffective thus allowing unfiltered liquid to pass through the outlet port. In addition, sediment tends to build up on the sock in a non uniform fashion thereby reducing the effectiveness of the apparatus.

In the known second type, a similar support frame is used except that instead of a wire frame, there is provided a cage in the form of rods or bars linking the tubular members. The other components of the second type are virtually identical with the first type.

The main disadvantage of the second type is that under relatively high pressure conditions, vibration of the frame occurs rendering the seal at the outlet port ineffective thereby allowing the passage of unfiltered liquid through the outlet port. Furthermore, as with the first type, sediment tends to build up on the filter element in a non-uniform fashion thereby reducing the effectiveness of the apparatus. In particular, the sediment tends to flow along the channels between the rods or bars of the cage and any break in the seal at the outlet port enables the undesirable discharge of a considerable amount of sediment.

It is an object of the present invention to overcome or ameliorate these problems. It is also an object of the present invention to provide an apparatus which may be used successfully for low, regular or high pressure filtering of a liquid, in particular milk. It is a still further object to provide an apparatus which may be used not only for filtering milk which is being discharged from a milk pump outlet into a tank, churn, etc. but, using appropriate wellknown attachments, to filter milk being pumped from a tank into a bulk container or vice versa at the rate of, for example, 700 gallons per hour using a double diaphragm positive pump, 1400 gallons per hour using a centrifugal pump, or up to 5400 gallons per hour using a suction pump.

The invention therefore provides an apparatus for use in filtering a liquid which apparatus comprises a casing for receiving the liquid; a removable filtering device housed in the casing, the device having a disposable filter element thereon; the casing having an inlet port for connection to a source of liquid to be filtered and an outlet port for filtered liquid; wherein the filtering device comprises a pair of collar members connected together by one or more rod members, the collar members also being linked by a frame in the form of a coil spring or spiral; and seal member(s) for providing, in use, a fluid tight engagement of the filtering device in the casing.

Preferably, the pair of collar members are connected together by a plurality of rod members to form a cage.

Preferably, the disposable filter element is in the form of a sock which is adapted to fit over the filtering device.

Preferably, the casing is tubular, one end of the casing having an opening for receiving the filtering device, said opening having a removable closure member, the other end of the casing having the outlet port and the inlet port being located in the peripheral wall of the casing.

Preferably, the outlet port of the casing is provided with an internal groove in which rests a seal member, and wherein said seal member is in the form of a plug having an opening therein which provides a passage for the liquid being discharged from the casing via the outlet port, the plug being adapted for tight fit engagement the collar member at the outlet port.

Preferably, the plug comprises a tubular member having an integral annular collar located at one end thereof; the annular collar having a first wall, which projects outwardly from the tubular member, and a second side wall; wherein the first wall provides a seat for one of said collar members; the second side wall tapers inwardly in the direction of the mouth of the bore; the internal wall of the tubular member flares outwardly at the mouth of the bore in the direction of the upwardly tapering second side wall such that the second side wall and the said internal wall intersect and form a substantially V-shaped ring which is adapted to seat itself in the groove in the outlet port end of the casing.

Preferably, the sock has a length which is longer than the length of the filtering device so that when in position on the filtering device, the free end of the sock may be tucked inside said collar member being retained in position by said plug.

Preferably, said closure member has a projecting tubular flange member which flange member defines a recess which is adapted to accomodate with the closed end of the sock and the collar member.

The invention will be understood in greater detail from the following description of a preferred embodiment thereof given by way of example only and with reference to the accompanying drawings in which:

FIG. 3 is a perspective view of a filtering device for use in the apparatus of FIG. 1;

FIG. 4 is a perspective view of a disposable filter element or sock for use on the device of FIG. 3;

FIG. 11 is an enlarged exploded view of the top of the apparatus of FIG. 1;

FIG. 12 is an underneath perspective view of one of the components of FIG. 11;

FIG. 13 is a partly cutaway view of the top of the device of FIG. 5;

FIG. 14 is a cross-sectional view of the top of the apparatus of FIG. 1.

Figure 1:
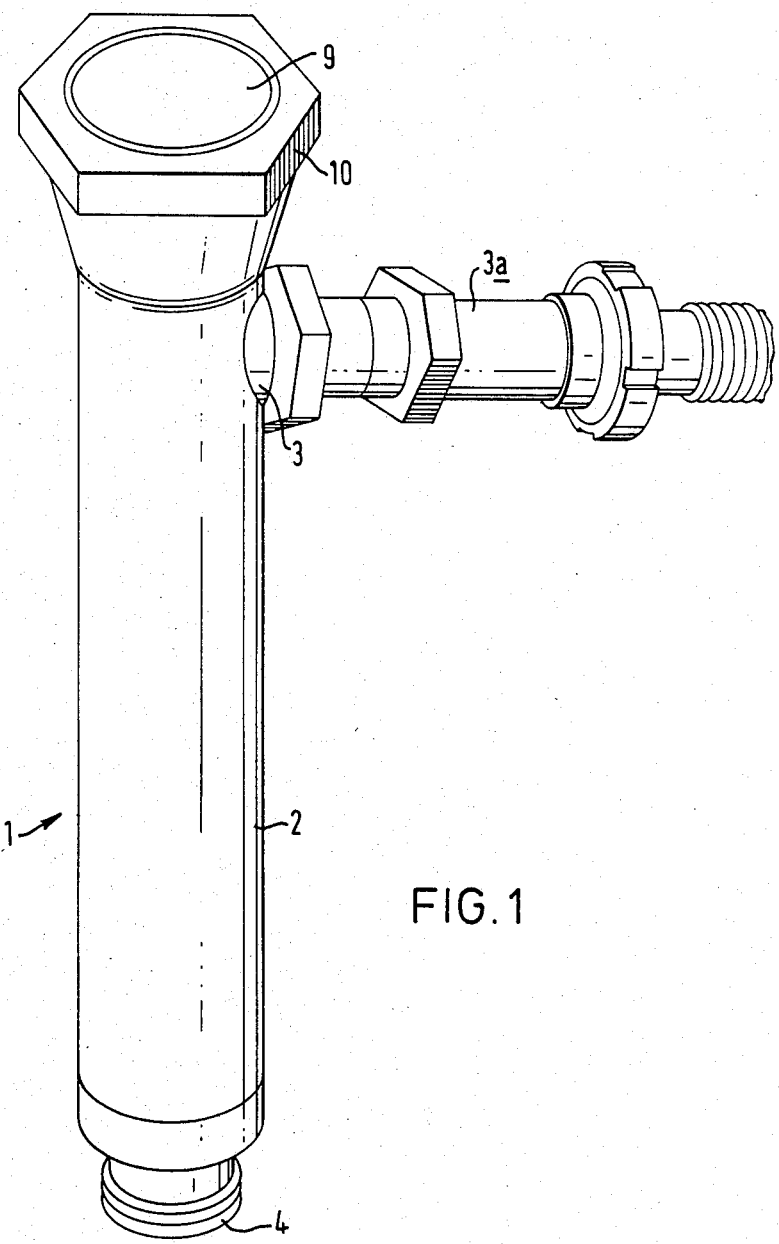
FIG. 1 is a perspective view of an apparatus according to the invention.
Figure 2:
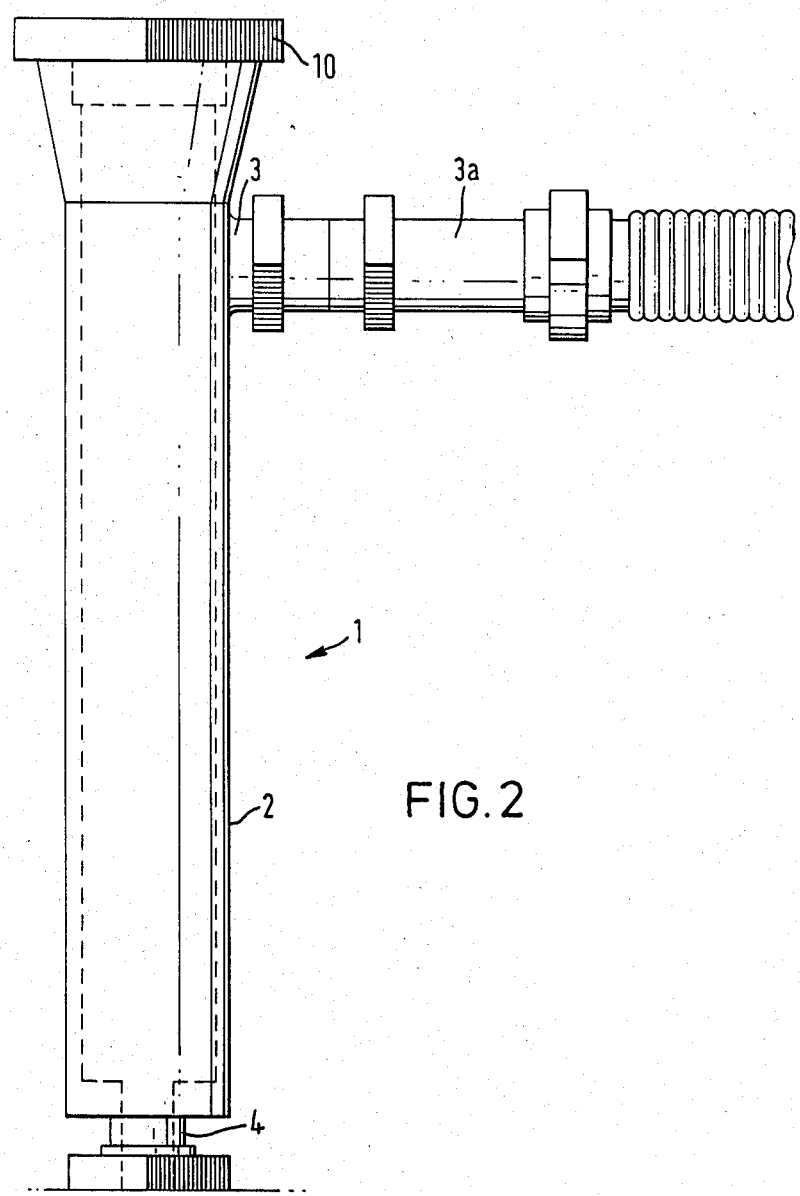
FIG. 2 is a side elevation of the apparatus of FIG. 1.

Referring now to the drawings in which like numerals refer to similar parts in several of the drawings, there is shown an apparatus according to the invention generally shown as 1. Essentially, the apparatus 1 comprises nine main components viz a substantially tubular casing 2; an inlet port 3 for a liquid to be filtered; an outlet port 4 for filtered liquid; a filtering device generally shown as 5 having a disposable filter sock 6 thereon; a sealing plug 7; an O-ring 8; a removable lid 9; and a locknut 10. A description of each of these main components will now be given followed by a description of the apparatus assembled and in use.

The tubular casing 2 preferably comprises heavy duty stainless steel having the inlet port 3 located in the peripheral wall thereof in the vicinity of the top of the casing 2. The inlet port 3 is threaded to facilitate the connection of an appropriate tube or duct 3a thereto. Just beyond the inlet port 3, the casing 2 flares outwardly to facilitate the insertion of the filtering device 5 into the casing 2. The bottom of the casing 2 has the outlet port 4 thereon which port 4 has a diameter less than the diameter of the casing 2. Essentially, therefore, the casing 2 has a floor 2a having the port 4 therein. Wall 4a of the outlet port 4 is threaded to facilitate the connection of an appropriate tube or duct (not shown). The floor 2a is provided with a circumferential groove 2b.

The filtering device 5 comprises a pair of collars 105, 205 which are connected together by a metal cage and a wire frame. The cage comprises three metal rods 305 in spaced relationship. The respective ends of each rod 305 are preferably welded to the inside surface of each collar 105, 205. The wire frame is in the form of a coil or spring 405. The respective ends of the coil spring 405 fit closely around the outside surface of each of the collars 105, 205. The collar 105, hereinafter referred to as the upper collar 105, has an integral closure member 105a. The bottom collar 205 is open at both ends.

The sock filter 6, which is disposable, has a pair of slits 6a located at the free end thereof. The slits 6a facilitate the insertion of the filtering device 5 into the sock 6. To place the sock 6 over the device 5, the upper collar 105 is inserted into the open end of the sock 6, and the sock 6 is gently pulled down to cover the device 5 (see FIG. 5). The sock 6 is slightly longer then the device 5 thus enabling the free end of the sock 6 to be tucked up inside the bottom collar 205. Into the collar 205 is inserted the plug 7.

Figure 8:
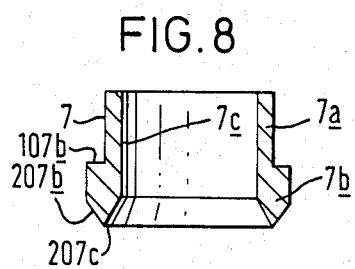
FIG. 8 is a cutaway view of the plug of FIG. 7.
Figure 9:
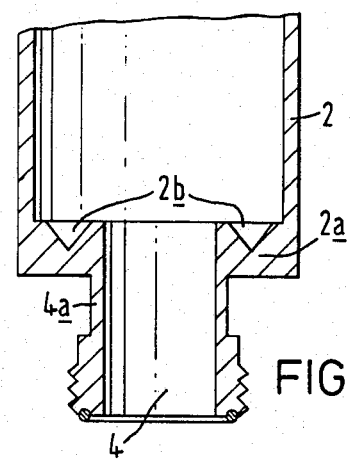
FIG. 9 is an enlarged cutaway view of the base of the casing of the apparatus of FIG. 7.

The plug 7 essentially comprises a tubular member 7a defining a through bore, the member having an integral annular collar 7b. A first wall or upper surface 107b of the collar 7b (see FIG. 8) is flat and projects outwardly from the tubular member 7a. A second wall or lower surface 207b of the collar 7b tapers inwardly. The inner wall 7c of the collar 7 flares outwardly and meets with the surface 207b to form a substantially V-shaped ring 207c. When the plug 7 is inserted into the bottom collar 205, the free end of the sock 6 is sandwiched between the outer wall of the plug 7 and the inner surface of the bottom collar 205 (see FIG. 10). The bottom collar 205 rests on the upper surface 107b of the plug 7. Thus the sock 6 is firmly held on the device 2 (see FIG. 5).

Figure 5:
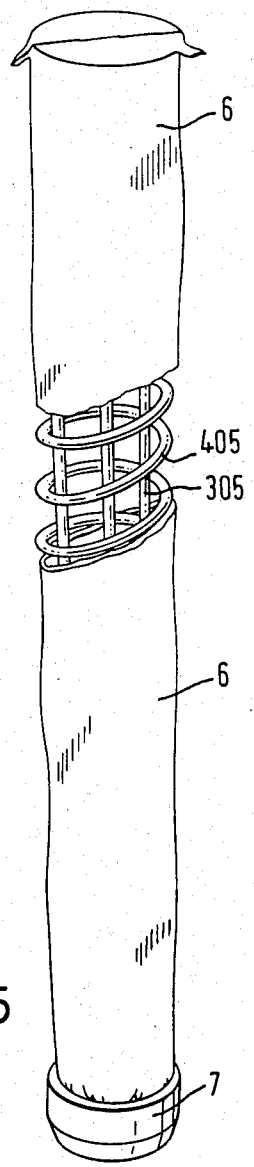
FIG. 5 is a perspective view of the device of FIG. 3 having, in partly cutaway section, the sock of FIG. 4, together with a sealing plug thereon.
Figure 6:
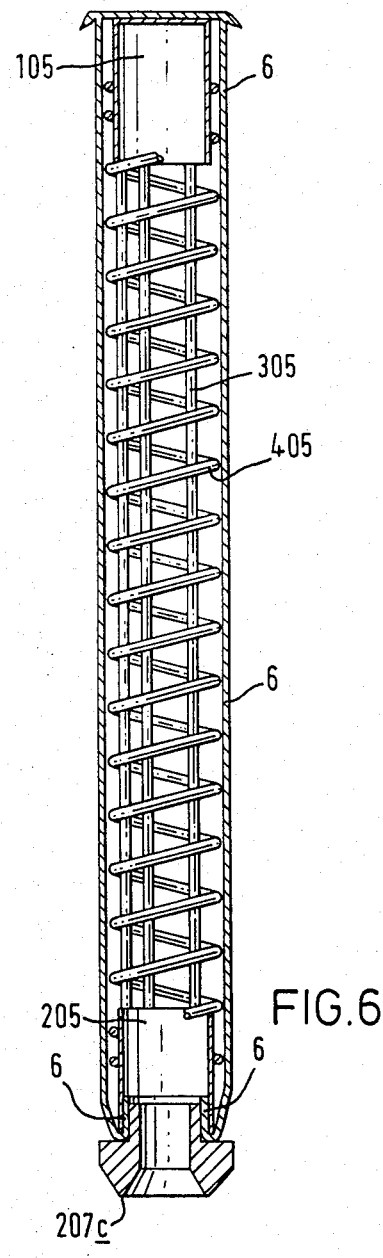
FIG. 6 is a cutaway view of the device of FIG. 5.
Figure 7:
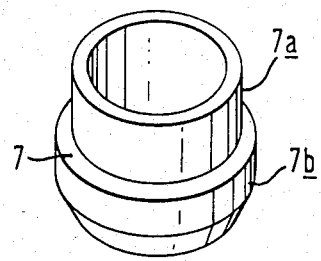
FIG. 7 is an enlarged perspective view of the plug of FIG. 5.
Figure 10:
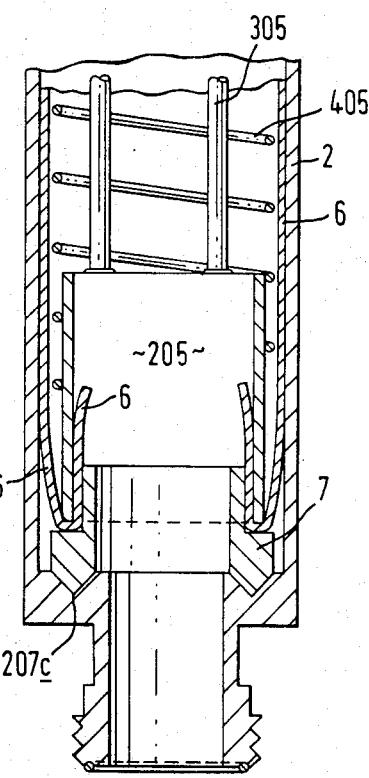
FIG. 10 is an enlarged cutaway view of the base of the apparatus of FIG. 1.

The assembled device of FIG. 5 is now inserted into the casing 2. The insertion is facilitated by the flared opening at the top of the casing 2. With reference to FIG. 10, it will be appreciated that when the plug 7 rests on the floor 2a, the ring 207c together with the flared surface of the inner wall 7c and the tapered surface 207b are seated in the groove 2b.

To complete the assembly, the O-ring 8, the closure member 9 and lock-nut 10 are placed in position.

The O-ring 8 is locatable in an annular groove on the peripheral wall of the casing 2.

The closure member 9 comprises an annular disc 9a having a downwardly projecting annular flange 9b which provides a recess 9c (see FIG. 12). When mounted on the casing 2, the lower surface of the disc 9a rests on the O-ring 8 and the upper collar 105 accomodates the closed end of the sock 6 inside the recess 9c. (See FIG. 14). The lock-nut 10 is screwed on the casing and is hand tightened. Hand tightening is sufficient to ensure that the plug 7 rests snugly and firmly on the floor 2a to provide both a liquid and air tight seal and the combination of the sock 6 and the annular flange 9b provide a similar seal at the top of the casing 2. The latter seal is not as critical as the former seal due to the fact that the sock 9 is closed at the top. It will also be appreciated that the O-ring 8 provides an effective conventional seal for the closure 9 on the casing 2.

In use, the apparatus 1 may be employed in the filtering of milk being discharged from a milk storage tank on a farm to a bulk milk carrier. Thus, the duct 3c is connected in a conventional manner to the discharge port of the storage tank and appropriate ducting attached to the outlet port 4 of the apparatus 1 may be connected to the intake port of the bulk tanker. If desired, the apparatus 1 may be an integral part of the storage tank or the bulk carrier as desired. A double diaphragm positive pump, a centrifugal pump, or a suction pump may be used to assist in the discharge of the milk from the storage tank to the bulk carrier. On a large farm, the storage tank may have a capacity in the region of 1000 gallons giving at its discharge port a very high pressure. Using the double diaphragm pump, it is possible to discharge the milk through the apparatus 1 at the rate of about 700 gallons per hour. In the case of the centrifugal pump, 1400 gallons per hour may be discharged through the apparatus 1. In the case of a suction pump, which is preferably an integral part of the bulk tanker, up to 5400 gallons per hour may be sucked from the storage tank to the bulk carrier.

As an example of the dimensions of the apparatus 1 for use in the above described conditions, the sock has a length of approximately 70 centimeters, the overall length of the filtering device 5 is approximately 65 centimeters and the inlet and outlet ports 3, 4 respectively have a diameter of approximately 5 centimeters. The diameter of the casing is approximately 8.75 centimeters which flares outwardly at the mouth thereof to approximately 10 centimeters.

If desired, the apparatus 1 may also be used for filtering milk being discharged from a milking pump to the storage tank.

It has been found that the apparatus 1 may be successfully used for hot filtering of milk (32° C.) or cold filtering of milk (4° C.).

Having regard to the construction of the apparatus 1 as described, it has been found that under relatively high pressure operating conditions, there is little or no vibration of the filtering device 5 inside the casing 2; and sediment, etc. builds up uniformly on the sock 6. Thus, the quality of the filtered milk is significantly improved.

It will be appreciated that, as is well known, the sock 6 should be replaced at appropriate intervals of use having regard to the degree of sediment, etc. which is captured by the sock 6.

It will be appreciated that other suitable liquids may be filtered by the apparatus 1.

The invention is not limited by or to the specific embodiment described which can undergo considerable variation without departing from the scope of the invention.

I claim:

1. An apparatus for use in filtering a liquid which apparatus comprises a casing for receiving the liquid; a removable filtering device housed in the casing, the device comprising a pair of collar members; at least one rod member connecting the collar members; a coil shaped frame linking the collar members; a disposable filter element on the frame; the casing having an inlet port for connection to a source of liquid to be filtered and an outlet port for filtered liquid; a seal member for providing, in use, a fluid tight engagement of the filtering device in the casing; the outlet port having an internal groove in which rests the seal member, the seal member being in the form of a plug having a through bore therein which provides a passage for the liquid being discharged from the casing via the outlet port, the plug having means for tight fit engagement with the collar member at the outlet port.

2. An apparatus as claimed in claim 1 in which the pair of collar members are connected together by a plurality of rod members, to form a cage.

3. An apparatus as claimed in claim 1 wherein the disposable filter element is in the form of a sock for fitting over the filtering device.

4. An apparatus as claimed in claim 1 wherein the casing is tubular, one end of the casing having an opening for receiving the filtering device, said opening having a removable closure member, the other end of the casing having the outlet port; and the inlet port being located in the peripheral wall of the casing.

5. An apparatus as claimed in claim 1 wherein the plug comprises a tubular member having an integral annular collar located at one end thereof; the annular collar having a first wall, which projects outwardly from the tubular member, and a second side wall; wherein the first wall provides a seat for one of said collar members; the second side wall tapers inwardly in the direction of the mouth of the bore; the internal wall of the tubular member flares outwardly at the mouth of the bore in the direction of the upwardly tapering second side wall such that the second side wall and the said internal wall intersect and form a substantially V-shaped ring which is adapted to seat itself in the groove in the outlet port end of the casing.

6. An apparatus as claimed in claim 5 wherein the sock has a length which is longer than the length of the filtering device so that when in position on the filtering device, the free end of the sock is tucked inside one of said collar members, and the free end of the sock is sandwiched between the outer wall of the tubular member and the inner wall of said collar member.

7. An apparatus as claimed in claim 4 wherein said closure member has a projecting tubular flange member which flange member defines a recess which is adapted to accommodate the closed end of the sock and the collar member.

* * * * *